US 8,813,239 B2

(12) United States Patent
Tibeica et al.

(10) Patent No.: US 8,813,239 B2
(45) Date of Patent: Aug. 19, 2014

(54) ONLINE FRAUD DETECTION DYNAMIC SCORING AGGREGATION SYSTEMS AND METHODS

(75) Inventors: Marius N Tibeica, Iasi (RO); Alin O Damian, Bucharest (RO); Razvan Visan, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 303 days.

(21) Appl. No.: 13/352,275

(22) Filed: Jan. 17, 2012

(65) Prior Publication Data

US 2013/0185802 A1 Jul. 18, 2013

(51) Int. Cl.
G06F 7/04 (2006.01)
(52) U.S. Cl.
USPC .......................................................... 726/26
(58) Field of Classification Search
USPC ................................. 726/22–26, 30
See application file for complete search history.

(56) References Cited

U.S. PATENT DOCUMENTS

| 7,451,487 | B2 | 11/2008 | Oliver et al. |
| 7,457,823 | B2 | 11/2008 | Shraim et al. |
| 7,665,140 | B2 | 2/2010 | Oliver et al. |
| 2006/0101120 | A1 | 5/2006 | Helsper et al. |
| 2007/0130350 | A1 | 6/2007 | Alperovitch et al. |
| 2007/0192855 | A1 | 8/2007 | Hulten et al. |
| 2009/0089859 | A1 | 4/2009 | Cook et al. |
| 2010/0281536 | A1* | 11/2010 | Richards et al. ............. 726/22 |

OTHER PUBLICATIONS

European Patent Office (EPO/ISA), International Search Report and Written Opinion Mailed May 17, 2013 for International Application No. PCT/RO2012000021, Applicant: Bitdefender IPR Management Ltd., p. 1-14.
Xiang et al., "Cantina+: A Feature—Rich Machine Learning Framework for Detecting Phishing Web Sites," ACM Transactions on Information and System Security, 14(2), p. 21:1-21:28, ACM, New York, NY, Sep. 1, 2011.

* cited by examiner

*Primary Examiner* — Beemnet Dada
(74) *Attorney, Agent, or Firm* — Law Office of Andrei D Popovici, PC

(57) ABSTRACT

In some embodiments, an online fraud prevention system combines the output of several distinct fraud filters, to produce an aggregate score indicative of the likelihood that a surveyed target document (e.g. webpage, email) is fraudulent. Newly implemented fraud filters can be incorporated and ageing fraud filters can be phased out without the need to recalculate individual scores or to renormalize the aggregate fraud score. Every time the output of an individual filter is calculated, the aggregate score is updated in a manner which ensures the aggregate score remains within predetermined bounds defined by a minimum allowable score and a maximum allowable score (e.g., 0 to 100).

28 Claims, 6 Drawing Sheets

ONLINE FRAUD DETECTION DYNAMIC SCORING AGGREGATION SYSTEMS AND METHODS

BACKGROUND

The invention relates to methods and systems for detecting online fraud.

Online fraud, especially in the form of phishing and identity theft, has been posing an increasing threat to Internet users worldwide. Sensitive identity information such as user names, IDs, passwords, social security and medical records, bank and credit card details obtained fraudulently by international criminal networks operating on the Internet are used to withdraw private funds and/or are further sold to third parties. Beside direct financial damage to individuals, online fraud also causes a range on unwanted side effects, such as increased security costs for companies, higher retail prices and banking fees, declining stock values, lower wages and decreased tax revenue.

In an exemplary phishing attempt, a fake website, sometimes also termed a clone, may pose as a genuine webpage belonging to an online retailer or a financial institution, asking the user to enter some personal/account information (e.g., username, password) and/or financial information (e.g. credit card number, account number, card security code). Once the information is submitted by the unsuspecting user, it is harvested by the fake website. Additionally, the user may be directed to another webpage which may install malicious software on the user's computer. The malicious software (e.g., viruses, Trojans) may continue to steal personal information by recording the keys pressed by the user while visiting certain webpages, and may transform the user's computer into a platform for launching other phishing or spam attacks.

Software running on an Internet user's computer system may be used to identify fraudulent online documents and to warn the user of a possible phishing/identity theft threat. Several approaches have been proposed for identifying a clone webpage, such as matching the webpage's Internet address to lists of known phishing or trusted addresses (techniques termed black- and white-listing, respectively).

In U.S. Pat. No. 7,457,823 B2, Shraim et al. describe a system which performs a plurality of tests on a web site or an electronic communication, assigns a score based on each of the tests, assigns a composite score based on the scores for each of the plurality of tests, and categorizes the web site/electronic communication as legitimate or fraudulent according to the plurality of scores and/or the composite score.

Experienced fraudsters are continuously developing countermeasures to such detection tools. Such countermeasures include frequently changing the IP addresses of the clone pages to escape blacklisting. Since the type and methods of online fraud evolve rapidly, successful detection may benefit from the development of new fraud-identifying tests.

SUMMARY

According to one aspect, a method comprises employing a computer system to determine an aggregate fraud score of a target document as a combination of a first fraud score and a second fraud score of the target document, wherein the first and second fraud scores are determined according to distinct fraud-evaluation procedures; determining a third fraud score of the target document; in response to determining the third fraud score, modifying the aggregate fraud score by a first amount determined according to a product of the third fraud score and a difference between the aggregate score and a maximum allowable aggregate score; and, in response to modifying the aggregate fraud score, determining whether the target document is fraudulent according to the modified aggregate score.

According to another aspect, a computer system comprises at least one processor programmed to: determine an aggregate fraud score of a target document as a combination of a first fraud score and a second fraud score of the target document, wherein the first and second fraud scores are determined according to distinct fraud-evaluation procedures; determine a third fraud score of the target document; in response to determining the third fraud score, modify the aggregate fraud score by a first amount determined according to a product of the third fraud score and a difference between the aggregate score and a maximum allowable aggregate score; and, in response to modifying the aggregate fraud score, determine whether the target document is fraudulent according to the modified aggregate score.

According to another aspect, a method comprises employing a computer system to determine whether a target document comprises a fraud-indicative feature; in response to determining whether the target document comprises the target-indicative feature, when the target document comprises the fraud-indicative feature, employing the computer system to modify a current value of an aggregate fraud score for the target document by an amount proportional to a difference between the current value of the aggregate score and a maximum allowable value of the aggregate fraud score, wherein the aggregate score is determined as a combination of a plurality of individual fraud scores; and in response to modifying the current value of the aggregate fraud score, employing the computer system to determine whether the electronic document is fraudulent according to the modified current value of the aggregate fraud score.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Unless otherwise specified, the term online fraud is not limited to fraudulent websites, but also encompasses other non-legitimate or unsolicited commercial electronic communications such as email, instant messages, and phone text and multimedia messages, among others. Computer readable media encompass non-transitory storage media such as magnetic, optic, and semiconductor media (e.g. hard drives, optical disks, flash memory, DRAM), as well as communications links such as conductive cables and fiber optic links. According to some embodiments, the present invention provides, inter alia, computer systems comprising hardware (e.g. one or more processors and/or memory) programmed to perform the methods described herein, as well as computer-readable media encoding instructions to perform the methods described herein.

The following description illustrates embodiments of the invention by way of example and not necessarily by way of limitation.

Figure 1:
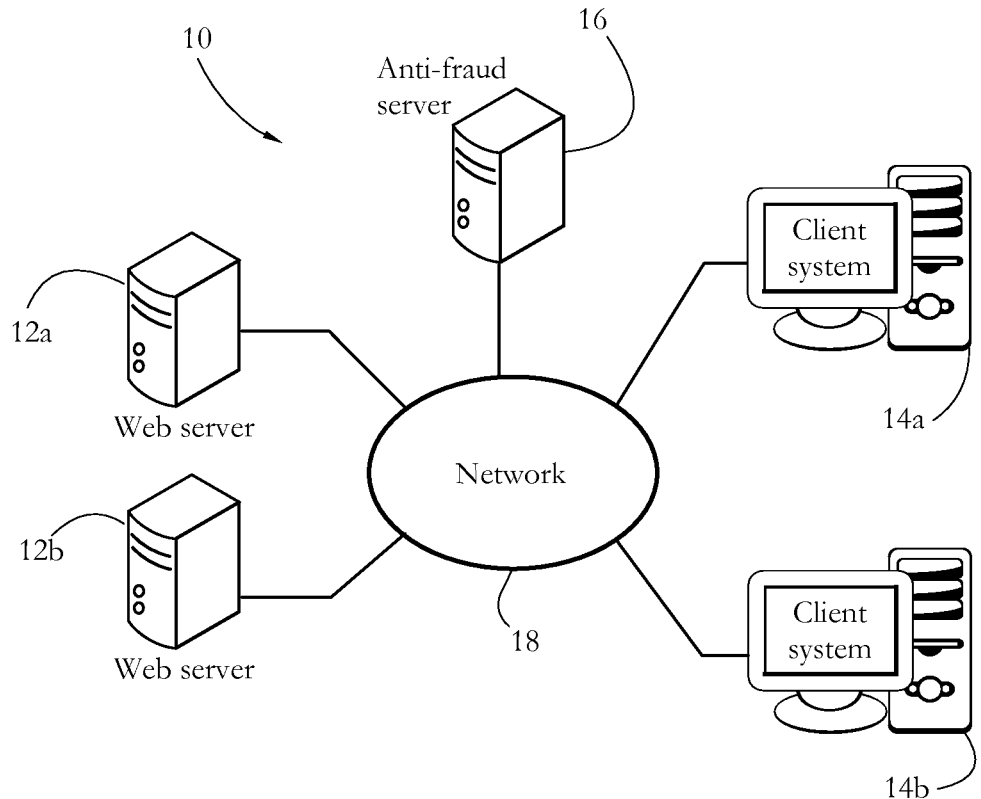
FIG. 1 shows an exemplary online fraud prevention system according to some embodiments of the present invention.

FIG. 1 shows an exemplary online fraud prevention system according to some embodiments of the present invention. System 10 includes a plurality of web servers 12a-b, an anti-fraud server 16, and a plurality of client systems 14a-b. Client systems 14a-b may represent end-user computers, each having a processor, memory, and storage, and running an operating system such as Windows®, MacOS® or Linux. Some client computer systems 14a-b may represent mobile computing and/or telecommunication devices such as tablet PCs, mobile telephones, and personal digital assistants (PDA). In some embodiments, client systems 14a-b may represent individual customers, or several client systems may belong to the same customer. Anti-fraud server 16 may include one or more computer systems. A network 18 connects web servers 12a-b, client systems 14a-b, and anti-fraud server 16. Network 18 may be a wide-area network such as the Internet, while parts of network 18 may also include a local area network (LAN).

Figure 2:
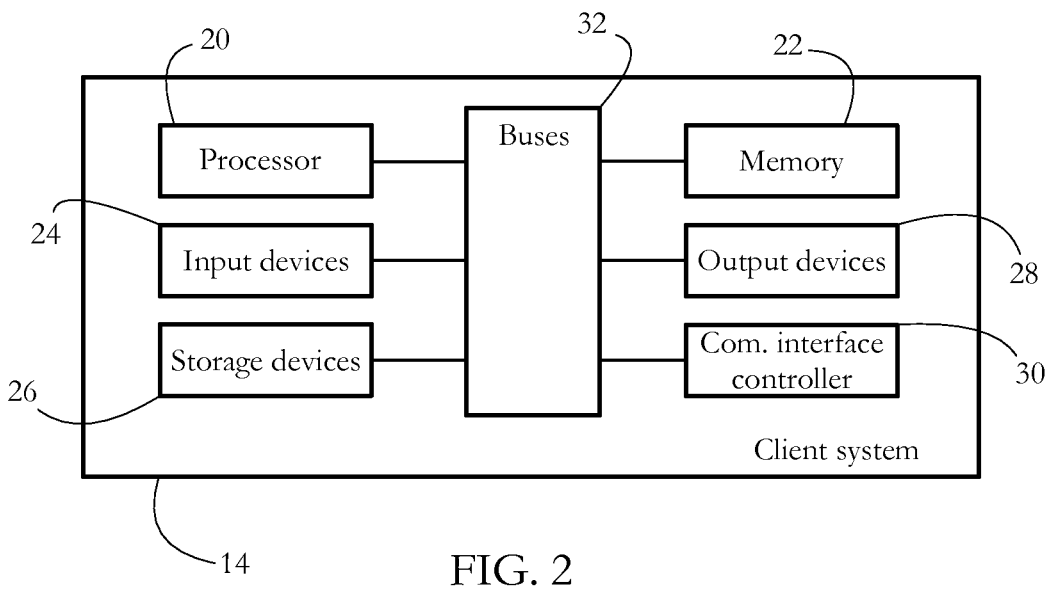
FIG. 2 shows an exemplary hardware configuration of a client system according to some embodiments of the present invention.

FIG. 2 shows an exemplary hardware configuration of a client system 14. In some embodiments, system 14 comprises a processor 20, a memory unit 22, a set of input devices 24, a set of output devices 28, a set of storage devices 26, and a communication interface controller 30, all connected by a set of buses 32.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise volatile computer-readable media (e.g. RAM) storing data/signals accessed or generated by processor 20 in the course of carrying out instructions. Input devices 24 may include computer keyboards and mice, among others, allowing a user to introduce data and/or instructions into system 14. Output devices 28 may include display devices such as monitors. In some embodiments, input devices 24 and output devices 28 may share a common piece of hardware, as in the case of touch-screen devices. Storage devices 26 include computer-readable media enabling the non-volatile storage, reading, and writing of software instructions and/or data. Exemplary storage devices 26 include magnetic and optical disks and flash memory devices, as well as removable media such as CD and/or DVD disks and drives. Communication interface controller 30 enables system 14 to connect to network 18 and/or to other machines/computer systems. Typical communication interface controllers 30 include network adapters. Buses 32 collectively represent the plurality of system, peripheral, and chipset buses, and/or all other circuitry enabling the intercommunication of devices 20-30 of system 14. For example, buses 32 may comprise the northbridge bus connecting processor 20 to memory 22, and/or the southbridge bus connecting processor 20 to devices 24-30, among others.

Figure 3:
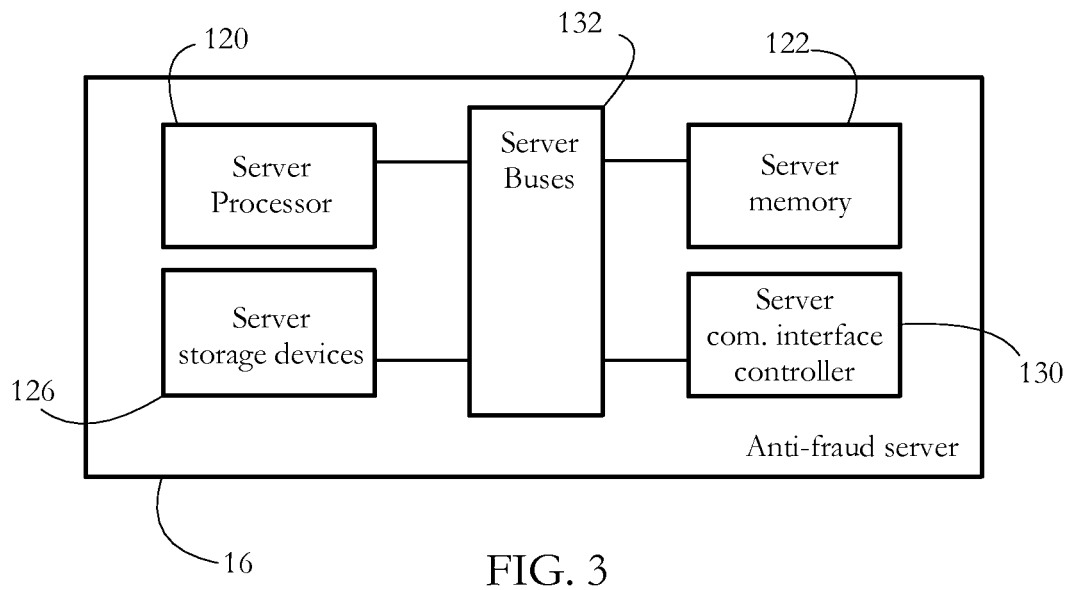
FIG. 3 shows an exemplary hardware configuration of anti-fraud server system according to some embodiments of the present invention.

FIG. 3 shows an exemplary hardware configuration of anti-fraud server 16, according to some embodiments of the present invention. Anti-fraud server 16 may be a computer system comprising a server processor 120, a server memory 122, a set of server storage devices 126, and a server communication interface controller 130, all connected to each other via a set of server buses 132. Although some details of hardware configuration may differ between anti-fraud server 16 and client system 14 (FIG. 2), the scope of devices 120, 122, 126, 130 and 132 may be similar to that of devices 20, 22, 26, 30, and 32 described above, respectively.

Figure 4:
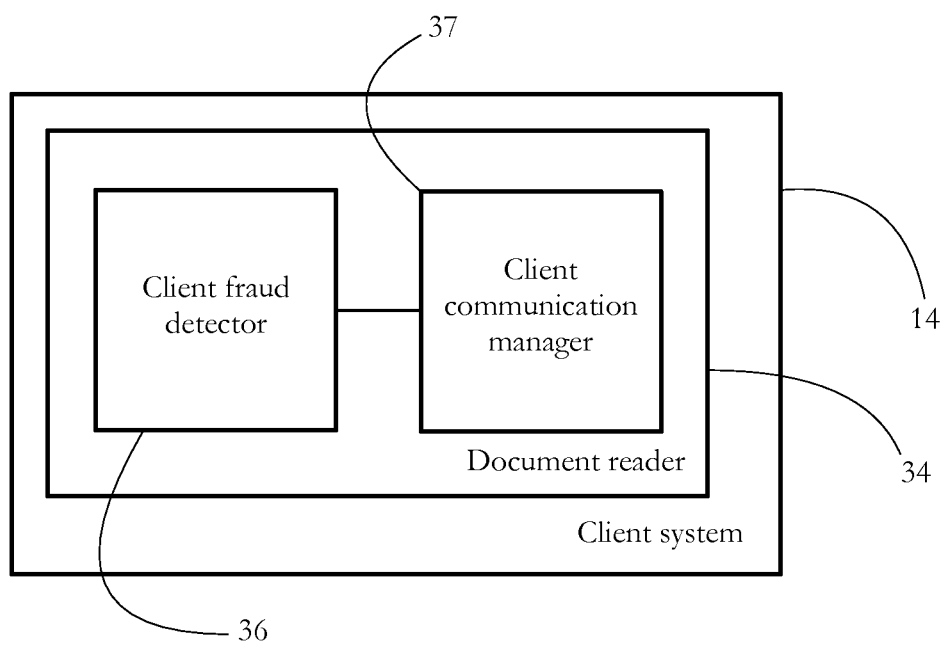
FIG. 4 illustrates a set of applications executing on a client system according to some embodiments of the present invention.

FIG. 4 shows an exemplary set of applications executing on a client system 14. In some embodiments, each client system 14a-b comprises a document reader application 34 (e.g. web browser, email reader, media player), which may be a computer program used to remotely access data stored on web servers 12a-b. When a user accesses an online document such as a webpage or electronic message (termed target document in the following discussion), data associated to the target document circulates on parts of network 18 between the respective web server and client system 14. In some embodiments, document reader application 34 receives the target document data, translates it into visual form and displays it to the user, allowing the user to interact with the target document's content.

In some embodiments, document reader application 34 includes a client fraud detector 36 and a client communication manager 37 connected to document reader 34. In some embodiments, client fraud detector 36 may determine whether a target document is fraudulent. For example, if a target webpage replicates the visual/semantic characteristics of a legitimate bank webpage requesting the credentials of the user, client fraud detector 36 may identify the target webpage as a phishing page. If fraud is detected, some embodiments of detector 36 may block the display of the target webpage by document reader 34 and/or issue a fraud warning to the user. Fraud detector 36 may be integrated with document reader 34 in the form of a plug-in, add-on, or toolbar. Alternatively, client fraud detector 36 may be a stand-alone software application, or may be a module of a security suite having antivirus, firewall, anti-spam, and other modules. In some embodiments, the operation of fraud detector 36 may be turned on and off by a user.

In some embodiments, client communication manager 37 is configured to manage communication of client system 14 with anti-fraud server 16 and/or webservers 12a-b. For example, manager 37 may establish connections over network 18, and send and receive data to/from servers 12a-b and 16.

Figure 5:
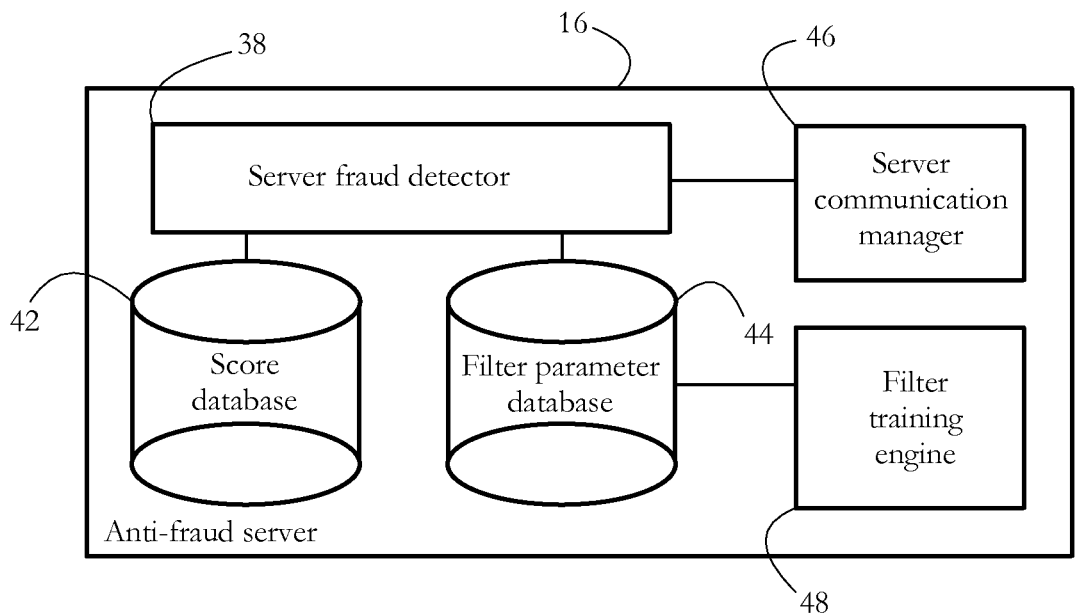
FIG. 5 shows an exemplary set of applications executing on the anti-fraud server of FIGS. 1-2, according to some embodiments of the present invention.

FIG. 5 shows a set of exemplary applications executing on anti-fraud server 16 according to some embodiments of the present invention. Anti-fraud server 16 may comprise a server fraud detector 38, a server communication manager 46, a fraud score database 42 and a filter parameter database 44, all connected to detector 38. In some embodiments, server 16 may also comprise a filter training engine 48 connected to filter parameter database 44. In some embodiments, server fraud detector 38 is configured to perform a plurality of fraud detection transactions with client systems 14a-b. For each such transaction, server fraud detector 38 is configured to conduct a server-side scan to determine whether a target document accessed by the respective client system is fraudulent or not, as described in detail below. Server communication manager 46 is configured to manage communication with client systems 14a-b. For example, manager 46 may establish connections over network 18, send and receive data to/from client systems 14a-b, maintain a list of ongoing fraud detection transactions, and associate target document data with originating client systems 14a-b.

Fraud score database 42 is maintained as a repository of online fraud knowledge. In some embodiments, database 42 comprises a plurality of recorded fraud scores calculated for a plurality of target documents, as described further below. Each score stored in database 42 may include additional information, such as a time stamp indicating a point in time when the respective score was calculated or updated, and/or an indicator (e.g. filter ID) of the fraud filter employed to compute the respective score (see below). Along with fraud scores, database 42 may also store a data structure comprising a plurality of target object identifiers (e.g. object IDs, tags, hashes), each object identifier uniquely associated to a target document, and a mapping associating each fraud score with the target document it was calculated for, allowing server fraud detector 38 to selectively retrieve recorded fraud scores from database 42, as shown below. In some embodiments, fraud score database 42 may reside on a computer system distinct from server 16, but connected to server 16 via network 18. Alternatively, database 42 may reside on non-volatile computer-readable media connected to server 16.

In some embodiments, filter parameter database 44 comprises a set of filter-specific parameters determining the operation of fraud filters (see below). Examples of filter parameters include a number of neurons per layer and a set of neuronal weights of a neural network-based filter, the position of cluster centers in a k-means-based classifier, and the number and position of color histogram bins in an image-processing filter. Other examples of filter parameters include a decision threshold, a set of network addresses, a set of fraud-indicative keywords, and a blacklist/whitelist of domain names. In some embodiments, the values of filter parameters stored in database 44 are provided by human operators. In some embodiments, fraud filters may be trained (optimized) to improve fraud-detection performance by varying the values of filter parameters. For example, filter training engine 48 may be configured to produce a set of filter parameters (e.g., training a neural network filter to distinguish fraudulent from legitimate documents may produce a set of neuronal weights) to be stored in database 44. In some embodiments, filter training engine 48 may operate on a computer system distinct from anti-fraud server 16, in which case filter parameters computed by engine 48 may be transferred to server 16 via periodic or on-demand updates.

Figure 6:
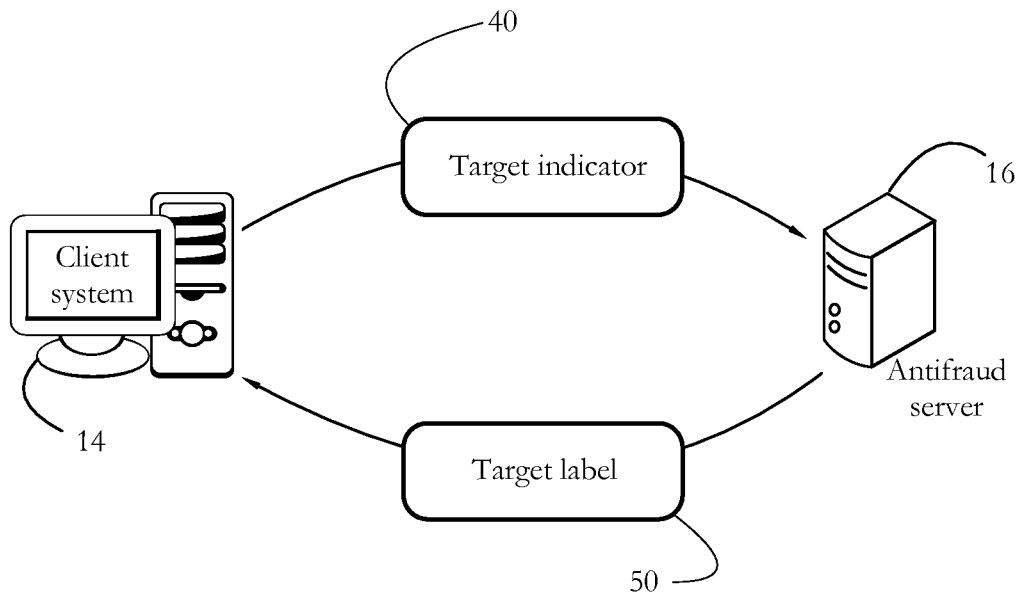
FIG. 6 illustrates an exemplary fraud-detecting transaction between a client system and the anti-fraud server, according to some embodiments of the present invention.

FIG. 6 illustrates an exemplary client-server fraud detection transaction. When a user requests to access an online document (e.g. a webpage), the respective client system 14 may send a target indicator 40 to anti-fraud server 16, and may receive a target label 50 from server 16. In some embodiments, target indicator 40 comprises data allowing anti-fraud server 16 to selectively access and/or retrieve the respective target document. Exemplary target indicators 40 comprise a uniform resource locator (URL) of a target webpage, a network address of a target document, and an IP address of a target Internet domain. In some embodiments, target indicator 40 may comprise an object identifier (e.g. a hash) of the target object, an address (e.g. a pointer) of the target object in a database accessible to server 16, or the target object itself, in part or in its entirety. Some embodiments of target indicator 40 may also comprise other data associated to the respective target document (e.g. a field from the HTTP header of the target document, a size and/or timestamp of the target document).

In some embodiments, target label 50 comprises an indicator of a fraud status (e.g. fraudulent, legitimate) of the target document, determined by anti-fraud server 16 in the course of the respective fraud detection transaction. Target label 50 may also comprise an identifier (object ID, etc.) of the respective target object, as well as other data such as a timestamp and an indicator of the type of fraud detected (e.g., phishing).

Figure 7:
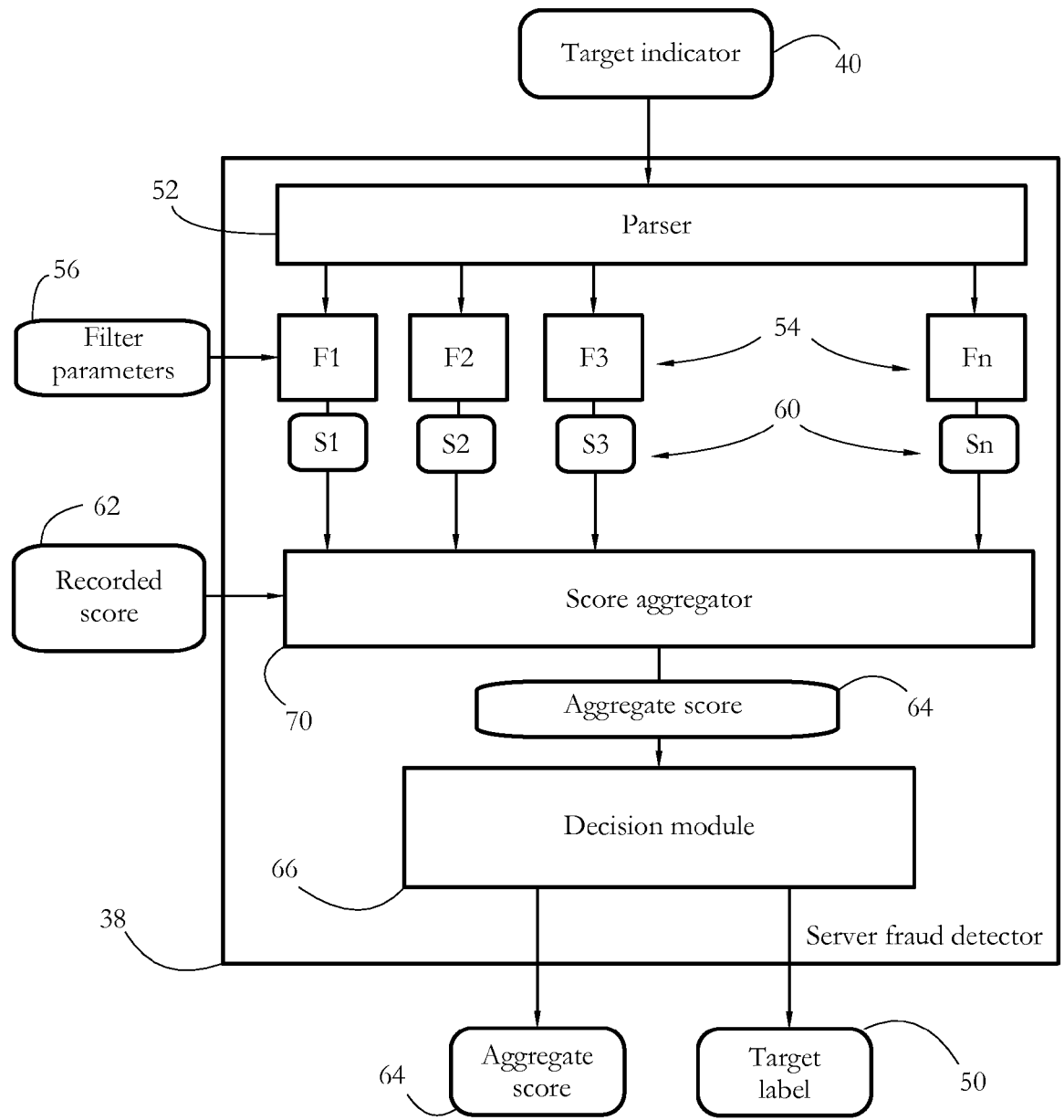
FIG. 7 shows a diagram of an exemplary server fraud detector application, according to some embodiments of the present invention.

FIG. 7 shows a diagram of server fraud detector 38 according to some embodiments of the present invention. Fraud detector 38 comprises a parser 52, a set of fraud filters 54 (denoted F1 . . . Fn in FIG. 7) connected to parser 52, a score aggregator 70 connected to filters 54, and a decision module 66 connected to score aggregator 70. In some embodiments, fraud detector 38 receives target indicator 40 from client system 14 and produces target label 50 indicating whether the target document identified by indicator 40 is fraudulent or not. Server fraud detector 38 may also retrieve a recorded fraud score 62 from fraud score database 42 and a set of filter parameters 56 from filter parameter database 44, and may output an aggregate fraud score 64 to score database 42.

In some embodiments, parser 52 receives target indicator 40 and processes the target document associated with indicator 40 into a form which is suitable as input for the various fraud filters 54. For example, when the target document is a webpage, parser 52 may break up the target webpage into constituent entities (e.g. header, body, text parts, images, etc.), may identify various features such as forms and hyperlinks, and extract specific data from the HTTP header (e.g. the referrer URL), among others. In some embodiments, parser 52 may determine a location of the target document (e.g., a URL) according to target indicator 40, and instruct server communication manager 46 to download a copy of the target document from the respective location.

In some embodiments, fraud filters 54 are computer programs, each implementing a distinct procedure for evaluating the legitimacy of the document indicated by target indicator 40. In some embodiments, operation of each fraud filter 54 may comprise evaluating the respective target document for fraud-indicative features (characteristic of fraudulent documents) and/or legitimacy-indicative features (characteristic of legitimate documents). An example of a fraud-indicative feature is a fraudulent referrer: when the user is directed to a particular webpage by clicking a link found in a phishing email, the respective webpage has a high probability of being fraudulent. Another fraud-indicative feature is the presence of a login form in a target webpage. An example of legitimacy-indicative feature is high traffic: domains receiving high traffic are less likely to be fraudulent than domains receiving only a few visitors.

A few exemplary fraud filters 54 are listed below:

a) A referrer filter may determine whether a target document is fraudulent according to a referrer of the respective document. In some embodiments, a referrer is a document (e.g. webpage) which links to and/or directs a user to the target document. For example, the HTTP header of a webpage may comprise the URL of the page visited just before the current one (also known as the referrer URL). In some embodiments, filter 54 maintains a blacklist and/or whitelist of referrer URLs, and compares the referrer of the target document to the black/whitelist entries. In some embodiments, a page referred to by a blacklisted URL is marked as fraudulent. In other embodiments, referrers recognized as spam messages, malware, and/or social network sites may be associated to higher probability of fraud than referrers such as, e.g., personal webpages and search engines.

b) A page layout filter may determine whether a target document is fraudulent according to the visual layout of the target document. In some embodiments, a webpage visually organized as a login page may be assigned a high probability of being fraudulent.

c) A keyword filter may maintain a list of keywords commonly associated with fraud. The presence of such keywords in a target document may determine the filter to label the respective target document as fraudulent.

d) An Internet domain history filter may use historical data about an Internet domain to determine the legitimacy of a target document hosted by the domain. In some embodiments, when there is indication that the respective domain has ever hosted a fraudulent webpage (e.g. phishing), or has ever been hacked into, the target document may be assigned a high probability of being fraudulent.

e) An Internet domain reputation filter may employ a set of reputation indicators such as an identity and/or address of the domain owner, a date when the domain was first registered under the current ownership, etc. In some embodiments, domains having the same owners as known fraudulent domains may be assigned a high probability of fraud. In some embodiments, domains showing frequent changes of ownership are also assigned a high probability of hosting fraudulent documents.

As the form and content of online fraud are continually changing, the fraud-detecting performance of filters 54 may vary in time. In some embodiments, the plurality of fraud filters 54 may be kept up to date by the addition of new filters and removal of older ones considered obsolete. A new filter may be introduced, for example, with the identification of a novel fraud-indicative feature. In some embodiments, fraud filters 54 may be selectively turned on or off by an operator. Alternatively, filters may be automatically inactivated after a certain time in service (e.g., one year), or according to other criteria. In some embodiments, each fraud filter 54 may comprise an identifier (filter ID), which distinguishes it from other fraud filters, allowing server fraud detector 38 to selectively employ any combination of fraud filters, and to maintain a record of which fraud filters were used to evaluate each target document.

Each fraud filter 54 inputs a set of data of the target document from parser 52, and a set of filter parameters 56 from filter parameter database 44, and outputs a score 60 to score aggregator 70. In some embodiments, each score 60 is a number between 0 and 1. Scores 60 may be fraud-indicative (high scores denoting a high probability that the target document is fraudulent) and/or legitimacy-indicative (high scores denoting a high probability that the target document is legitimate). For example, a fraud-indicative score of 0.85 produced by a certain fraud filter 54 may indicate that the respective document has an 85% likelihood of being fraudulent according to that particular fraud filter. In some embodiments, scores 60 may have binary values (e.g., 1/0, yes/no).

TABLE 1

| No. of queries | 0-49 | 50-99 | 100-199 | 200-299 | 300-399 | 400-549 | 550-749 | >750 |
|---|---|---|---|---|---|---|---|---|
| Score | 0.00 | 0.14 | 0.28 | 0.43 | 0.57 | 0.71 | 0.86 | 1.00 |

Table 1 shows an exemplary set of scores 60 produced by a fraud filter 54 according to estimated Internet traffic. The filter registers a number of requests (queries) from various client systems 14 to scan a particular target webpage. The number of queries may be indicative of the Internet traffic at the respective URL, and high traffic may be an indication of a legitimate webpage. The exemplary score is legitimacy-identifying (higher score indicative of higher likelihood of legitimacy).

Score aggregator 70 (FIG. 7) is configured to combine individual scores 60 produced by fraud filters 54 into an aggregate score 64 of the respective target document. In some embodiments, aggregate score 64 is a number indicative of the likelihood that the target object is fraudulent (e.g., a number between 0 and 100, with 0 indicating a certainty of legitimacy, and 100 indicating a certainty of fraud). In some embodiments, server fraud detector 38 is configured so that every time a target document is evaluated, a copy of aggregate score 64 is recorded in score database 42, along with an indicator of the target document and an indicator of the fraud filters used in the calculation (e.g., the respective filter IDs). This allows database 42 to operate like a cache: when the same target document is evaluated again, server fraud detector 38 may retrieve a recorded score 62 of the target document from database 42, without having to re-compute it, thus conserving computing resources. Only fraud filters 54 which have not been used previously to analyze the respective target document (e.g. new filters introduced since the last scan of the target document) are employed to produce scores 60, which are combined with recorded score 62 to produce aggregate score 64.

To compute aggregate score 64, aggregator 70 may first initialize score 64 to a value equal to recorded score 62 of the respective target document. Then, for each fraud filter i producing a score $\sigma_i$, some embodiments of aggregator 70 may modify aggregate score 64 iteratively, as follows.

When score $\sigma_i$ is fraud-indicative (high score indicative of high likelihood of fraud), the current value of the aggregate score is replaced by a new value:

$$S_A \rightarrow S_A + (S_{max} - S_A) w_i \sigma_i \qquad [1]$$

wherein $S_A$ denotes the aggregate score, $S_{max}$ denotes an upper bound of the aggregate score (maximum allowable score, e.g., 100), and $w_i$ denotes a weight of the respective fraud filter. When fraud score $\sigma_i$ is legitimacy-indicative (high score indicative of high likelihood of legitimacy), the aggregate score is updated to:

$$S_A \rightarrow S_A - (S_A - S_{min}) w_i \sigma_i \quad [2]$$

wherein $S_A$ denotes the aggregate score, $S_{min}$ denotes a lower bound of the aggregate score (minimum allowable score, e.g., 0), and $w_i$ denotes a weight of the respective fraud filter.

In some embodiments, each filter weight $w_i$ is a number between 0 and 1, representing a degree of reliability of the respective filter. Some features of a target document may associate more strongly with fraud than others. For example, a link to a known phishing page is typically a stronger indication of fraud than the presence of the word "Password". Consequently, a score $\sigma_i$ computed by a fraud filter specialized in analyzing the hyperlinks of a target document may receive a higher weight $w_i$ than a score $\sigma_j$ computed by a fraud filter which detects the presence of keywords such as "Password". In some embodiments, filter weights $w_i$ may be provided by an operator, or may be the result of an automated filter training procedure.

In an exemplary calculation employing formulae [1]-[2], a target webpage received an aggregate score of 40 (measured on a scale from 0 to 100) in a previous fraud scan. At a later time, a reliable new filter is introduced ($w_1$=1); it returns a fraud-indicative score $\sigma_1$=0.3 for the target webpage. Aggregator 70 computes a new aggregate score 40+(100-40)*0.3=58. Meanwhile, a domain traffic filter (weight $w_2$=0.5) returns a legitimacy-indicative score $\sigma_2$=0.2. The aggregate score is now 58−58*0.5*0.2≈52.

In some embodiments, decision module 66 (FIG. 7) receives aggregate score 64 from aggregator 70 and outputs target label 50. To determine target label 50, some embodiments of decision module 66 may compare aggregate score 64 to a predetermined threshold. When score 64 exceeds the threshold, the target document may be labeled as fraudulent, otherwise it may be labeled as legitimate. An exemplary threshold value of 50 was used in some computer experiments.

Figure 8:
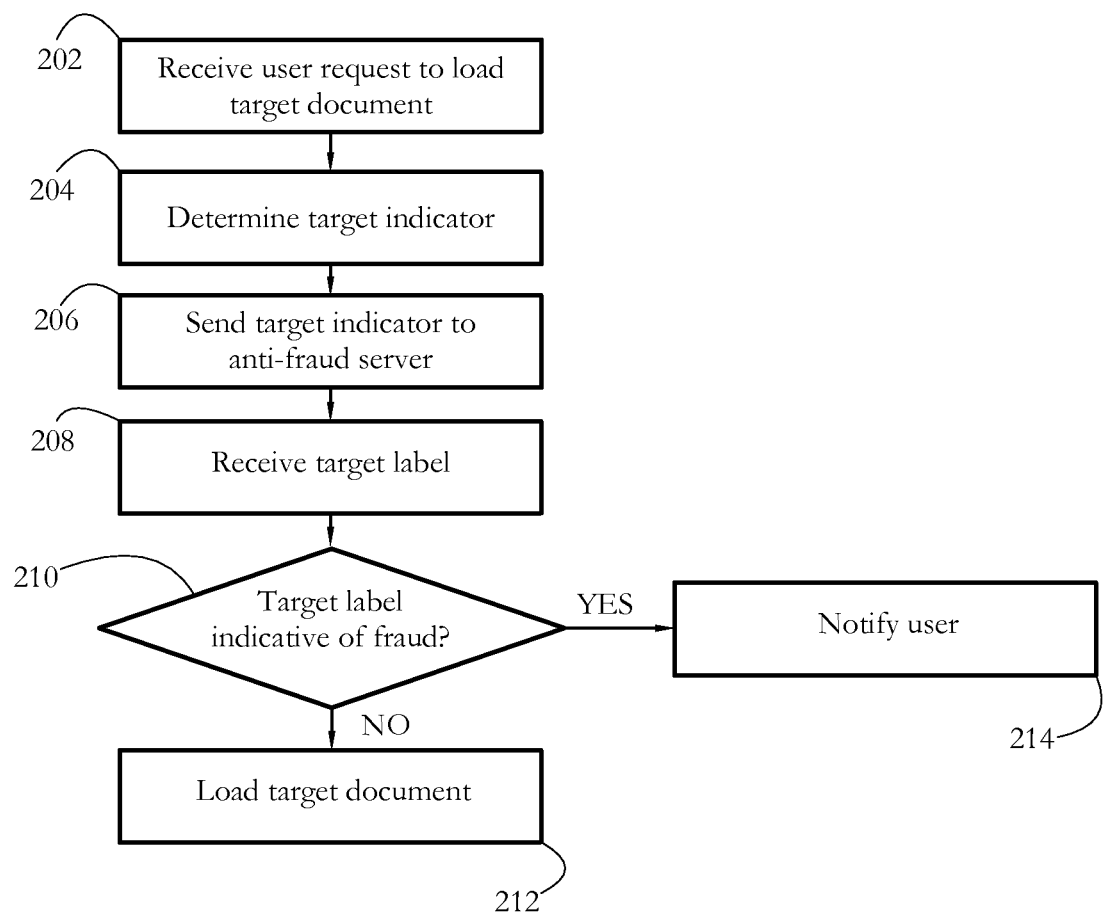
FIG. 8 shows an exemplary sequence of steps executed by the client system according to some embodiments of the present invention.

FIG. 8 shows an exemplary sequence of steps executed by client system 14 in the course of a fraud detection transaction, according to some embodiments of the present invention. In a step 202, system 14 receives a user request to access a target document (e.g., to display a webpage in a browser application). In a step 204, client fraud detector 36 may determine target indicator 40 associated to the target document. In the example of the target webpage, indicator 40 may comprise the URL of the target webpage, among others. In a step 206, client communication manager 37 may establish a connection with anti-fraud server 16 over network 18, to transmit target indicator to server 16. Next, in a step 208, communication manager 37 receives target label 50 from server 16. In a step 210, fraud detector 36 determines according to target label 50 whether the respective target document is fraudulent or not. When label 50 indicates a legitimate document, in a step 212, client system 14 may load the target document (e.g., display the target webpage to the user). When target label 50 indicates a fraudulent document, in a step 214, client system 14 may notify the user by e.g. displaying a fraud warning. In some embodiments, step 214 may further comprise blocking access to the target document.

Figure 9:
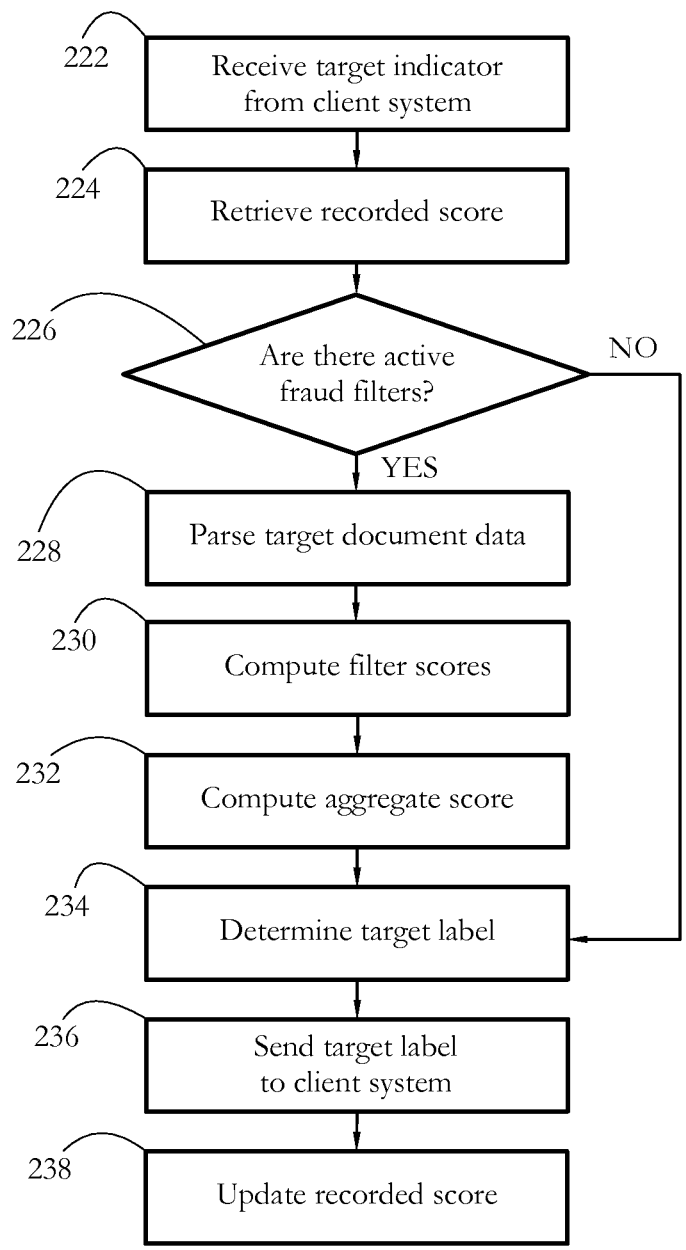
FIG. 9 illustrates an exemplary sequence of steps carried out by the anti-fraud server according to some embodiments of the present invention.

FIG. 9 shows an exemplary sequence of steps performed by anti-fraud server 16 in the course of a fraud detection transaction, according to some embodiments of the present invention. In a step 222, server communication manager 46 receives target indicator 40 from client system 14. In a step 224, server fraud detector 38 may retrieve recorded score 62 associated to the respective target document from score database 42. Next, in a step 226, detector 38 determines according to the data (e.g. filter IDs) stored in relation to recorded score 62 which fraud filters 54 were used to compute score 62, and whether a score update is necessary. In some embodiments, a new aggregate score is computed whenever there exists at least one fraud filter 54 which has not been applied to the target document (for example, every time a new fraud filter is introduced, or when the parameters of an existing fraud filter have changed). When a score update is not required (e.g. when recorded score 62 is an aggregation of scores 60 from all filters 54), the operation of server 16 proceeds to a step 234 described further below. Otherwise, in a step 228, parser 52 may produce a set of data of the target document, suitable as input to filters 54. In some embodiments, step 228 may further comprise remotely accessing or downloading the target document, in part or in its entirety, onto server 16.

In a step 230, a subset of filters 54 may input target document data from parser 52, to produce corresponding scores 60. In a step 232, score aggregator 70 may compute aggregate score 64 by combining scores 60 computed in step 230 with recorded score 62 retrieved in step 224. In some embodiments, aggregator 70 may employ formula [1] to compute aggregate score 64. Next, in a step 234, decision module 66 may produce target label 50 according to the aggregate score. In some embodiments, when no new score aggregation was carried out, module 66 may determine target label 50 according to recorded score 62. In a step 236, server fraud detector 38 instructs communication manager 46 to send target label 50 to the originating client system 14. In a step 238, server fraud detector 38 may update score database 42, by replacing recorded score 62 with the newly computed aggregate score 64. In some embodiments, data about the update (e.g., IDs of filters participating in the aggregate score, timestamp, etc.) is saved along with aggregate score 64.

The exemplary systems and methods described above allow an online fraud prevention system to employ several distinct fraud filters simultaneously and to dynamically combine the individual outputs of the fraud filters to produce an aggregate score indicative of the likelihood that a surveyed target document (e.g. webpage, electronic communication) is fraudulent.

Online fraud may come in many different forms. Some examples of fraudulent online documents include: a webpage pretending to represent a financial institution; a webpage hosting an escrow scam; a social networking (e.g., Facebook®) page carrying out a scam; a webpage hosting an online casino scam, a money loan scam, or a pay-per-click scam; a webpage hosting an online dating scam or an employment/recruitment scam. Other examples of online fraud are phishing webpages and/or electronic messages attempting to acquire sensitive information such as user names, passwords and credit card details by masquerading as a trustworthy entity. Other fraudulent webpages and electronic messages may contain and/or attempt to install malicious software on a user's computer, said malware being used to steal identity or other private information.

Individual fraud filters evaluate a number of fraud-indicative and/or legitimacy indicative features of the target document, such as determine whether a webpage comprises a login form or a set of fraud-indicative keywords, or whether the Internet domain hosting the target document has a history of hosting fraudulent documents.

In some embodiments, fraud scores produced by individual filters may be fraud-indicative (high score indicative of high likelihood of fraud), or legitimacy-indicative (high score indicative of high likelihood of legitimacy). Fraud-indicative scores may increase the aggregate fraud score, whereas legitimacy-indicative scores may decrease the aggregate score, according to a common calculation procedure.

The exemplary systems and methods described here allow the dynamic incorporation of newly implemented fraud filters and/or the phasing out of ageing fraud filters, without the need to recalculate individual scores produced by said filters, or to renormalize the aggregate fraud score. Every time an individual fraud score is calculated, the aggregate score is updated in a manner which allows it to remain within predetermined bounds (e.g., 0 to 100).

Some embodiments of the present invention conduct a collaborative client-server fraud detection transaction, and assess the fraud status (e.g., fraudulent/legitimate) of the target object according to the results of the server-side scan of the target object. Conducting a part of the fraud detection on a remote server has a number of advantages over local fraud detection on a client computer system.

By performing a significant part of fraud-detection centrally on a server, the systems and methods described above allow for the timely incorporation of data on newly detected online fraud. For example, webpage white/blacklists can be maintained much more efficiently on a central server. By contrast, when fraud detection is performed on client computer systems, updated white/blacklists must be distributed to a great number of clients every time a new threat is discovered.

The size of data packets exchanged between client and anti-fraud server systems described above is kept to a minimum. Instead of sending entire target documents from the client to the server for fraud-detection, the exemplary methods and systems described above are configured to exchange target indicators such as target URL's, amounting to several bytes per target object, thus significantly reducing network traffic.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
employing a computer system to determine an aggregate fraud score of a target document as a combination of a first fraud score and a second fraud score of the target document, wherein the first and second fraud scores are determined according to distinct fraud-evaluation procedures;
employing the computer system to determine a third fraud score of the target document;
in response to determining the third fraud score, employing the computer system to modify the aggregate fraud score by a first amount determined according to a product of the third fraud score and a difference between the aggregate score and a maximum allowable aggregate score; and
in response to modifying the aggregate fraud score, employing the computer system to determine whether the target document is fraudulent according to the modified aggregate score.

2. The method of claim 1, wherein employing the computer system to determine the third fraud score of the target document is performed in response to adding a distinct fraud-evaluating procedure corresponding to the third fraud score to a set of fraud-evaluating procedures used to generate the aggregate fraud score.

3. The method of claim 1, wherein the first amount is determined as a function of:

$$(S_{max} - S_A)w\sigma$$

wherein $S_A$ and $S_{max}$ are the aggregate score and the maximum aggregate score, respectively, wherein $\sigma$ is the third fraud score, and wherein w is a number indicative of a reliability of the third score.

4. The method of claim 1, wherein determining the third fraud score comprises determining whether the target document includes a fraud-indicative feature, and wherein modifying the aggregate fraud score comprises increasing the aggregate fraud score by the first amount when the target document includes the fraud-indicative feature.

5. The method of claim 1, further comprising, in response to employing the computer system to determine the aggregate score:
employing the computer system to determine a fourth fraud score of the target document; and
employing the computer system to modify the aggregate fraud score by a second amount determined according to a product of the fourth fraud score and a difference between the aggregate score and a minimum allowable aggregate score.

6. The method of claim 5, wherein the second amount is determined as a function of:

$$(S_A - S_{min})w\sigma$$

wherein $S_A$ and $S_{min}$ are the aggregate score and the minimum allowable aggregate score, respectively, wherein $\sigma$ is the fourth fraud score, and wherein w is a number indicative of a reliability of the fourth score.

7. The method of claim 5, wherein determining the fourth fraud score comprises determining whether the target document includes a legitimacy-indicative feature, and wherein modifying the aggregate fraud score comprises decreasing the aggregate fraud score by the second amount when the target document includes the legitimacy-indicative feature.

8. The method of claim 1, wherein determining the third fraud score comprises evaluating a referrer document comprising a hyperlink to the target document.

9. The method of claim 8, wherein evaluating the referrer document comprises determining whether the referrer document is a social networking webpage.

10. The method of claim 8, wherein evaluating the referrer document comprises determining whether the referrer document is a spam message.

11. The method of claim 1, wherein determining the third fraud score comprises determining whether the target document comprises a fraud-indicative layout feature.

12. The method of claim 11, wherein the layout feature comprises an electronic form.

13. The method of claim 1, wherein determining the third fraud score comprises determining whether an Internet domain hosting the target document has been hacked into.

14. A computer system comprising:
at least one hardware processor and a hardware memory, the hardware memory storing a set of instructions which, when executed by the at least one hardware processor, cause the computer system to
determine an aggregate fraud score of a target document as a combination of a first fraud score and a second fraud score of the target document, wherein the first and second fraud scores are determined according to distinct fraud-evaluation procedures;
determine a third fraud score of the target document;

in response to determining the third fraud score, modify the aggregate fraud score by a first amount determined according to a product of the third fraud score and a difference between the aggregate score and a maximum allowable aggregate score; and in response to modifying the aggregate fraud score, determine whether the target document is fraudulent according to the modified aggregate score.

15. The computer system of claim 14, wherein determining the third fraud score of the target document is performed in response to adding a distinct fraud-evaluating procedure corresponding to the third fraud score to a set of fraud-evaluating procedures used to generate the aggregate fraud score.

16. The computer system of claim 14, wherein the first amount is determined as a function of:

$$(S_{max}-S_A)w\sigma$$

wherein $S_A$ and $S_{max}$ are the aggregate score and the maximum aggregate score, respectively, wherein $\sigma$ is the third fraud score, and wherein w is a number indicative of a reliability of the third score.

17. The computer system of claim 14, wherein determining the third fraud score comprises determining whether the target document includes a fraud-indicative feature, and wherein modifying the aggregate fraud score comprises increasing the aggregate fraud score by the first amount when the target document includes the fraud-indicative feature.

18. The computer system of claim 14, wherein the processor is further programmed to, in response to determining the aggregate score:

determine a fourth fraud score of the target document; and
modify the aggregate fraud score by a second amount determined according to a product of the fourth fraud score and a difference between the aggregate score and a minimum allowable aggregate score.

19. The computer system of claim 18, wherein the second amount is determined as a function of:

$$(S_A-S_{min})w\sigma$$

wherein $S_A$ and $S_{min}$ are the aggregate score and the minimum allowable aggregate score, respectively, wherein $\sigma$ is the fourth fraud score, and wherein w is a number indicative of a reliability of the fourth score.

20. The computer system of claim 19, wherein determining the fourth fraud score comprises determining whether the target document includes a legitimacy-indicative feature, and wherein modifying the aggregate fraud score comprises decreasing the aggregate fraud score by the second amount when the target document includes the legitimacy-indicative feature.

21. The computer system of claim 14, wherein determining the third fraud score comprises evaluating a referrer document comprising a hyperlink to the target document.

22. The computer system of claim 21, wherein evaluating the referrer document comprises determining whether the referrer document is a social networking webpage.

23. The computer system of claim 21, wherein evaluating the referrer document comprises determining whether the referrer document is a spam message.

24. The computer system of claim 14, wherein determining the third fraud score comprises determining whether the target document comprises a fraud-indicative layout feature.

25. The computer system of claim 24, wherein the layout feature comprises an electronic form.

26. The computer system of claim 14, wherein determining the third fraud score comprises determining whether an Internet domain hosting the target document has been hacked into.

27. A method comprising:

employing a computer system to determine whether a target document comprises a fraud-indicative feature;

in response to determining whether the target document comprises the target-indicative feature, when the target document comprises the fraud-indicative feature, employing the computer system to modify a current value of an aggregate fraud score for the target document by an amount proportional to a difference between the current value of the aggregate score and a maximum allowable value of the aggregate fraud score, wherein the aggregate score is determined as a combination of a plurality of individual fraud scores; and in response to modifying the current value of the aggregate fraud score, employing the computer system to determine whether the electronic document is fraudulent according to the modified current value of the aggregate fraud score.

28. A non-transitory computer-readable medium storing instructions which, when executed by at least one hardware processor of a computer system, cause the computer system to:

determine an aggregate fraud score of a target document as a combination of a first fraud score and a second fraud score of the target document, wherein the first and second fraud scores are determined according to distinct fraud-evaluation procedures;

determine a third fraud score of the target document;

in response to determining the third fraud score, modify the aggregate fraud score by a first amount determined according to a product of the third fraud score and a difference between the aggregate score and a maximum allowable aggregate score; and in response to modifying the aggregate fraud score, determine whether the target document is fraudulent according to the modified aggregate score.

* * * * *